United States Patent
Ryang et al.

(10) Patent No.: US 6,169,119 B1
(45) Date of Patent: Jan. 2, 2001

(54) METAL OXIDE SOLS AND PROCESS FOR MAKING THE SAME

(75) Inventors: Hong-Son Ryang, Camirillo; Young Jin Chung, Calabasas, both of CA (US); Joseph T. Snyder, II, Chesterland, OH (US); An-Min Jason Sung, Morris Plains, NJ (US)

(73) Assignee: Reliance Electric Technologies, LLC, Thousand Oaks, CA (US)

( * ) Notice: Under 35 U.S.C. 154(b), the term of this patent shall be extended for 0 days.

(21) Appl. No.: 09/023,368

(22) Filed: Feb. 13, 1998

Related U.S. Application Data

(63) Continuation-in-part of application No. 08/801,832, filed on Feb. 14, 1997, now Pat. No. 5,780,525.

(51) Int. Cl.$^7$ ........................................... B01F 3/12
(52) U.S. Cl. ........................ 516/90; 423/DIG. 14; 516/33; 516/88; 516/93; 524/397; 524/398; 524/399; 526/318.2; 556/55
(58) Field of Search .................. 516/33, 88, 90, 516/93; 524/399, 397, 398; 501/12; 423/DIG. 14; 556/55; 526/318.2; 106/287.19

(56) References Cited

U.S. PATENT DOCUMENTS

| | | | |
|---|---|---|---|
| 2,926,183 | * 2/1960 | Russell | 556/55 |
| 3,056,818 | * 10/1962 | Werber | 556/55 X |
| 3,198,817 | * 8/1965 | Langer . | |
| 3,635,915 | * 1/1972 | Gale | 526/318.2 X |
| 4,087,402 | * 5/1978 | Monte et al. | 524/397 X |
| 4,594,382 | * 6/1986 | Hoenig et al. | 524/397 X |
| 4,772,660 | * 9/1988 | Kitamura et al. | 516/93 X |
| 4,857,492 | * 8/1989 | Bradley et al. | 516/33 X |
| 4,923,518 | 5/1990 | Brand et al. | 106/429 |
| 5,047,174 | 9/1991 | Sherif | 252/309 |
| 5,372,796 | * 12/1994 | Wellinghoff | 516/88 X |
| 5,389,361 | 2/1995 | Osterried et al. | 424/59 |
| 5,567,755 | * 10/1996 | Hashimoto et al. | 524/397 X |
| 5,698,205 | * 12/1997 | Brückner et al. | 516/90 X |
| 5,780,525 | * 7/1998 | Ryang et al. | 522/81 |
| 5,814,137 | * 9/1998 | Blohowiak et al. | 501/12 X |
| 5,820,664 | * 10/1998 | Gardiner et al. | 423/DIG. 14 |
| 5,959,016 | * 9/1999 | Schmidt et al. | 524/399 |

FOREIGN PATENT DOCUMENTS 50-5177 * 2/1975 (JP) ........................................ 556/55

OTHER PUBLICATIONS

C.J. Brinker and G.W. Sherer, Chapter 1: Introduction, Sol–Gel Science, Physics and Chemistry of Sol–Gel Processing (1990), pp. 1–13.

C.J. Brinker and G.W. Sherer, Chapter 2: Hydrolysis and Condensation I, Nonsilicates, Sol–Gel Science, Physics and Chemistry of Sol–Gel Processing (1990), pp. 20–79.

* cited by examiner

*Primary Examiner*—Richard D. Lovering
(74) *Attorney, Agent, or Firm*—Gregory Turocy; John J. Horn; William R. Walbrun

(57) ABSTRACT

In one embodiment, the present invention relates to metal oxide sols comprising a liquid and a polycondensation product of about 2 to about 5,000 monomers of a partially hydrolyzed chelated metal oxide precursor. In another embodiment, the present invention relates to a process for making a metal oxide sol comprising contacting a metal oxide precursor with a multifunctional compound in a liquid to provide a chelated metal oxide precursor; contacting the chelated metal oxide precursor with a hydrolyzing agent to provide partially hydrolyzed chelated metal oxide precursor monomers; and permitting the partially hydrolyzed chelated metal oxide precursor monomers to polycondense thereby forming a metal oxide sol.

25 Claims, No Drawings

METAL OXIDE SOLS AND PROCESS FOR MAKING THE SAME

This application is a continuation-in-part of application Ser. No. 08/801,832 filed Feb. 14, 1997 now U.S. Pat. No. 5,780,525.

FIELD OF THE INVENTION

The invention relates to metal oxide sols and processes for making the same. More particularly, the invention relates to metal oxide sols and processes for making the same involving the use of a multifunctional compound containing a chelating group.

BACKGROUND OF THE INVENTION

It is known to incorporate additives into base substances, such as polymers, ceramics etc., as a means of enhancing the properties of the base substance or as a means of imparting new properties to the base substance. For instance, it is known to add filler compounds to resins in order to improve the physical properties of the resin.

As a specific example, curable electrical component coatings include inorganic additives to achieve the desired surface electrical stress endurance. Such inorganic additive materials include alumina, silica and fumed metal oxide particulate additives and other non-transparent materials. Many inorganic additives are by nature resistive to high temperature processing, both in production and in use, and they are resistive to oxidative degradation. Most inorganic additives, however, due to their compositional and physical makeup, require the use of high shear mixing when incorporated into a polymer to achieve a uniform, homogeneous composition. High shear mixing inherently creates voids in the resulting coating due to the entrapment of air in the protective coating mixture. The presence of voids in the cured coating allows corona generation which attacks the underlying substrate and degrades the coating itself under electrical stress when in use. Accordingly, it is desired to provide an additive which does not require high shear mixing and/or which does not lead to the presence of voids in a base substance in which it is incorporated.

In photocurable resin systems, using non-transparent material additives with photocure processing techniques results in non-uniform curing, as the light energy curing agent may unevenly penetrate the curable resin, due to particle blockage and scattering, thus curing some resin segments and not curing others. Another problem caused by the same uneven, non-uniform penetration of the various additives is the premature cure of the resin. When using a photo initiated curing process, it is generally necessary to have particles of less than 0.2 microns. Particles in excess of 0.2 microns are capable of scattering light, thus potentially resulting in uneven curing. Commercially available particulate fillers which require high speed mixing to maintain homogeneity tend to agglomerate causing regions of higher particle concentration and regions of lower concentration. This can lead to accelerated oxidation in the particle-poor regions. Accordingly, it is desired to provide an additive which does not agglomerate, which is small in size, transparent in nature and/or capable of uniform distribution.

One problem with using metal oxide particulate material in a liquid substance is the propensity for precipitation of the material from a solution over time, thus limiting the shelf life of the solution. For example, the use of commercially available fumed alumina or silica results in precipitation of the particulate metal oxide material after about one week in storage. Since fumed alumina or silica is of high viscosity, increased amounts of solvent are needed to attain a coatable composition. Accordingly, it is desired to provide an additive which does not precipitate from solution and/or has a desirable viscosity.

U.S. Pat. No. 4,760,296 generally relates to the inclusion of organosilicates or organoaluminates as the organometallic material of choice to achieve improved electrical stress endurance of an epoxy resin system. The '296 patent also relates to organoaluminates such as aluminum acetylacetonate and aluminum di-sec-butoxide acetoacetic ester chelate, which can be used to produce clear resins. However, the organoaluminum compounds of the '296 patent are not suitable for a variety of resin systems. This is because they tend to (1) plasticize the cured articles, (2) generate non-uniform distribution of the additives in the cured articles, and/or (3) bleach out with aging. The same three disadvantages are associated with using fumed aluminum oxide in resin systems. Using fumed aluminum oxide also involves the disadvantages that a clear solution cannot be formed and that the viscosity is undesirably high, further contributing to the creation of voids in the resulting coating thus rendering the coating susceptible to corona attack.

These problems are minimized by using the metal oxide sols of the present invention, which can be low viscosity materials and which can lead to the creation of transparent resins susceptible to photocuring processes.

SUMMARY OF THE INVENTION

In one embodiment, the present invention relates to metal oxide sols comprising a liquid and a polycondensation product of about 2 to about 5,000 monomers of a partially hydrolyzed chelated metal oxide precursor.

In another embodiment, the present invention relates to a process for making a metal oxide sol comprising contacting a metal oxide precursor with a multifunctional compound in a liquid to provide a chelated metal oxide precursor; contacting the chelated metal oxide precursor with a hydrolyzing agent to provide partially hydrolyzed chelated metal oxide precursor monomers; and permitting the partially hydrolyzed chelated metal oxide precursor monomers to polycondense thereby forming a metal oxide sol.

In yet another embodiment, the present invention relates to a metal oxide sol made by a process comprising contacting a metal oxide precursor with a multifunctional compound to provide a chelated metal oxide precursor; hydrolyzing the chelated metal oxide precursor to provide partially hydrolyzed chelated metal oxide precursor monomers; and permitting the partially hydrolyzed chelated metal oxide precursor monomers to polycondense thereby forming a metal oxide sol.

One advantage of the metal oxide sols is that they are relatively stable. This leads to a long shelf life. Another advantage is that the open functionalities of the condensed partially hydrolyzed chelated metal oxide precursors of the metal oxide sols have the capability of reacting with a base substance in which it is incorporated.

Another advantage in plastics made with the inventive metal oxide sols is that corona resistance of a polymer substance made with the metal oxide sols is markedly increased because of the presence of the condensed partially hydrolyzed chelated metal oxide precursors. In this connection, the metal oxide sols are not polymer fillers in the traditional sense (merely dispersed in the polymer); instead, the metal oxide sols are incorporated into the polymer network on a molecular level.

DETAILED DESCRIPTION OF THE INVENTION

The invention relates to metal oxide sols and processes for making the metal oxide sols. A "sol", as the term is used herein, refers to a composition comprising a liquid colloidal dispersion containing a liquid phase and a dispersed phase. The liquid phase of the liquid colloidal dispersion may be aqueous and/or organic, and in particular, may be at least one of water and organic liquids such as alcohols, glycols and other protic organic solvents. Organic solvents include methanol, ethanol, propanol, isopropanol, sec-butanol, t-butanol, methoxyethanol, ethoxyethoxyethanol, ethylene glycol and propylene glycol. The liquid phase may also be a liquid or partially liquid substance to which a metal oxide sol can be added such as resin monomers. For example, in the case where it is desired to incorporate metal oxide sols into a curable resin, the liquid phase of the metal oxide sols may be constituted by curable resin monomers in liquid form.

The dispersed phase of the liquid colloidal dispersion comprises condensed partially hydrolyzed chelated metal oxide precursors. The condensed partially hydrolyzed chelated metal oxide precursors are micro-clusters which generally have an amorphous shape, although in some embodiments a somewhat symmetrical shape is obtained.

In one embodiment, the condensed partially hydrolyzed chelated metal oxide precursors have an average size (the size is the average diameter of a micro-cluster) of less than about 10 nm, preferably less than about 5 nm, and more preferably less than about 2 nm. It will be appreciated that some micro-clusters have a size larger than about 10 nm, as the average size refers to calculating the average of a random sample of micro-cluster diameters, each diameter to be averaged itself representing the average diameter of a generally amorphous micro-cluster in the random sample. The average size of a micro-cluster can be preferably determined with a transmission electron microscope, although an atomic force microscope can also be useful. If necessary, the size can be compared with conventional filler having a known size.

In general, a metal oxide sol can be produced by contacting a metal oxide precursor with a multifunctional compound, typically in a liquid solvent. The multifunctional compound contains at least one reactable functional group and at least one chelating functional group. The chelating functional group of the multifunctional compound coordinates with the metal oxide precursor to form a chelated metal oxide precursor. The chelated metal oxide precursor is hydrolyzed by a hydrolyzing agent, for example by contact with water, to provide a metal oxide sol.

Suitable metal oxide precursors are capable of being converted to a chelated metal oxide precursor by contact with a compound containing a chelating group. Metal oxide precursors include metal organic compounds and inorganic salts. Metal organic compounds include metal alkoxides and metal carboxylates. Metal alkoxides and metal carboxylates include metal methoxides, metal ethoxides, metal isopropoxides, metal propoxides, metal butoxides, metal ethylhexoxides, metal (triethanolaminato)isopropoxides, metal bis(ammonium lacto)dihydroxides, metal bis(ethyl acetoacetato)diisopropoxides, metal bis(2,4-pentanedionate) diisopropoxides, metal acetates, metal ethylhexanoates, metal gluconates, metal oxalates, metal propionates, metal pantothenates, metal cyclohexanebutyrates, metal trifluoroacetylacetonates, metal citrates, and metal methacrylates. Inorganic salts include metal halides and metal nitrates. In a preferred embodiment, the metal oxide precursor is a metal alkoxide.

The metal of the metal oxide precursors include transition metals, alkaline earth metals and metallic elements of Groups 3A, 4A and 5A of the periodic table of elements and combinations thereof. Transition metals include Sc, Ti, V, Cr, Mn, Fe, Co, Ni, Cu, Zn, Y, Zr, Nb, Mo, Tc, Ru, Rh, Pd, Ag, Cd, Ba, La, Hf, Ta, W, Re, Os, Ir, Pt, Au, Hg and Ac. Alkaline earth metals include Be, Mg, Ca, Sr and Ba. Group 3A metallic elements include B, Al, Ga, In and Tl. Group 4A metallic elements include Ge, Sn and Pb. Group 5A metallic elements include As, Sb and Bi. In a preferred embodiment, the metal of the metal oxide precursors is at least one of aluminum, titanium and zirconium. In another preferred embodiment, the metal of the metal oxide precursors, metal organic compounds and inorganic salts is not silicon. In embodiments where two or more metals are present as the metal of the metal oxide precursors, metal organic compounds and inorganic salts, the first metal is one of those listed above and the second metal is preferably boron or silicon.

Metal oxide precursors include at least one of transition metal alkoxides, alkali metal alkoxides, alkaline earth metal alkoxides, Groups 3A, 4A and 5A alkoxides, transition metal carboxylates, alkali metal carboxylates, alkaline earth metal carboxylates, Groups 3A, 4A and 5A carboxylates, transition metal halides, alkali metal halides, alkaline earth metal halides, Groups 3A, 4A and 5A halides, transition metal nitrates, alkali metal nitrates, alkaline earth metal nitrates and Groups 3A, 4A and 5A nitrates. Preferred metal oxide precursors include metal organic compounds and inorganic salts of Groups 3A and 4B of the periodic table of elements such as aluminum alkoxides, aluminum halides, titanium alkoxides, titanium halides, zirconium alkoxides and zirconium halides.

Specific examples of metal oxide precursors include aluminum triethoxide, aluminum isopropoxide, aluminum sec-butoxide, aluminum tri-t-butoxide, aluminum lactate, aluminum nitrate, aluminum chloride, aluminum bromide, aluminum fluoride, aluminum iodide, calcium acetate, calcium ethylhexanoate, calcium gluconate, calcium oxalate, calcium propionate, calcium pantothenate, calcium cyclohexanebutyrate, calcium nitrate, calcium chloride, calcium bromide, calcium fluoride, calcium iodide, magnesium acetate, magnesium trifluoroacetylacetonate, magnesium methoxide, magnesium ethoxide, magnesium methylcarbonate, magnesium gluconate, magnesium nitrate, magnesium chloride, magnesium bromide, magnesium fluoride, magnesium iodide, tin acetate, tin oxalate, tin chloride, tin bromide, tin fluoride, tin iodide, tin bis (acetylacetonate)dibromide, tin bis(acetylacetonate) dichloride, titanium methoxide, titanium ethoxide, titanium isopropoxide, titanium propoxide, titanium butoxide, titanium ethylhexoxide, titanium (triethanolaminato) isopropoxide, titanium bis(ammonium lacto)dihydroxide, titanium bis(ethyl acetoacetato)diisopropoxide, titanium bis (2,4-pentanedionate)diisopropoxide, titanium chloride, titanium bromide, titanium fluoride, titanium iodide, zinc acetate, zinc methacrylate, zinc stearate, zinc cyclohexanebutyrate, zinc nitrate, zinc chloride, zinc bromide, zinc fluoride, zinc iodide, zirconium ethoxide, zirconium isopropoxide, zirconium propoxide, zirconium sec-butoxide, zirconium t-butoxide, zirconium acetate, zirconium citrate, zirconium chloride, zirconium bromide, zirconium fluoride, zirconium iodide and combinations of two or more of the above compounds.

The following example illustrates the preparation of a metal oxide precursor.

EXAMPLE A
Preparation of Metal Oxide Precursor

A mixture of aluminum triisopropoxide (20.4 gm) and 2-methoxyethanol (76 gm) in a round bottle flask is heated to 90° C. for one hour to obtain a homogenous solution. Subsequently, part of the solvent (mainly isopropanol) is removed under vacuum to give a clear, low viscosity solution (54.5 gm), containing 46% aluminum trimethoxyethoxide.

The multifunctional compound is any compound capable of coordinating to a metal oxide precursor through a chelating functional group. The multifunctional compound which is contacted with the metal oxide precursors contains at least one reactable functional group and at least one chelating functional group. The chelating functional groups generally coordinate through nitrogen, oxygen, sulfur, phosphorus, arsenic and/or selenium atoms; thus chelating functional groups contain at least one of N, O, S, P, As and Se atoms. Chelating functional groups include polyphosphates, β-diketones, acetoacetonates, aminocarboxylic acids, hydroxycarboxylic acids, hydroxyquinolines, polyamines, aminoalcohols, aromatic heterocylic bases, phenols, aminophenols, oximes, phosphonic acids, Schiff bases, tetrapyrroles, thiols, xanthates, and salicylic acid. The chelating functional groups coordinate to (react with) the metal of the metal oxide precursor in such a way to form a coordinated or chelated metal oxide complex that can prevent gelation of the sol by retarding, preventing or partially preventing hydrolysis and/or condensation.

The reactable functional group of the multifunctional compound group does not substantially interact or bond with the metal oxide precursor. Instead, the reactable functional group interacts with a substance with which the metal oxide sols are subsequently combined. In other words, the reactable functional group is capable of reacting, interacting or bonding with another substance or compound. For example, reactable functional groups include curable functional groups, photoreactive functional groups, thermocurable groups, interactable groups, solvateable groups, and condensable groups. Reactable functional groups include an acrylic unsaturated bond and other radiation curable aliphatically unsaturated functional groups, such as vinyl and acrylamide groups, styryl, acrylic, hydroxy, amine, carboxylic, thio, and phenol groups. Reactable functional groups can ensure good compatibility of the metal oxide sol with a substance with which the metal oxide sols are subsequently combined. The resulting combination of the metal oxide sol and the substance provides a nanocomposite in which the metal oxide sol is uniformly distributed in the substance at a molecular level.

In a few embodiments, especially when a relatively small amount or equivalents of the multifunctional compound (compared to the metal oxide precursor) is used, the reactable functional group may initially chelate with the metal oxide precursor; but once the partially hydrolyzed chelated metal oxide precursor or the micro-clusters are contacted with the substance with which the metal oxide sols are subsequently combined, the reactable functional group uncoordinates with the metal oxide precursor and reacts, interacts or bonds with the substance.

Multifunctional compounds are commercially available and/or can be prepared by reacting a compound containing a chelating functional group with a compound containing a reactive functional group. For example, a multifunctional compound can be prepared by reacting a compound containing a chelating functional group such as 4-aminosalicylic acid with a compound containing a reactive functional group such as methacryloylchloride to provide 4-methacryloylamino salicylic acid. In a preferred embodiment, the multifunctional compound is prepared by reacting a compound containing a chelating functional with a compound containing a reactive functional group such as a vinyl, an acrylic or a hydroxyl group.

Specific multifunctional compounds which can be used in accordance with the invention include acrylic acid/maleic acid copolymer, alkoxylated diamines, alkyl-diaminepolyacetic acids, aminoalkylphosphonic acid, amino tris(methylene phosphonic acid), anthranilic acid, benzotriazole, citric acid, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, methylvinyl ether/ maleic acid copolymer, o-hydroxybenzoylacetone, 5-hydroxy-2-(hydroxymethyl)-4H-pyran-4-one, 3-hydroxy-2-methyl-4-pyrone, 4-hydroxy-6-methyl-2-pyrone, 8-hydroxyquinoline, N-hydroxyethylenediamine triacetic acid, hydroxy-ethylidene diphosphonic acid, hydroxyethane diphosphonic acid, nitrilotriacetic acid, sorbitol, tolyltrizole, o-hydroxybenzoylacetone, 2-hydroxydibenzoylmethane and N-(acetoacetyl)glycine.

Supplemental multifunctional compounds, which contain at least one of a reactable functional group and chelating functional group, can optionally be used in addition to the multifunctional compound. Supplemental multifunctional compounds include polyacrylic acid, poly(ethylene glycol) methacrylate, and poly(propylene glycol) methacrylate. Supplemental multifunctional compounds are contacted with the metal oxide precursor just before, at the same time, or just after the multifunctional compound and the metal oxide precursor are combined.

The following example illustrates the preparation of a multifunctional compound.

EXAMPLE B
Preparation of a Multifunctional Compound

To a solution of purified toluene/diethyl ether (30 ml/30 ml), 4-aminosalicylic acid (6.58 gm, 43 mmole) is added in a glass vessel. After cooling to below 5° C. (in an ice/water bath), methacryloylchloride (5 gm, 43 mmole) is slowly added to the mixture while stirring. The resulting mixture is stirred for three hours, during which the temperature is allowed to increase gradually to room temperature. The solid fraction is collected by filtration and then washed several times with toluene/diethyl ether. The organic extracts are combined, washed with a small amount of water, and dried with $Na_2SO_4$. Removal of the solvent under vacuum gives a colorless solid (4.5 gm). FTIR of the solid confirms the formation of 4-(methacryloylamino)salicylic acid.

The metal oxide sol can be prepared in accordance with the following procedure. A metal oxide precursor is contacted with a multifunctional compound. In a preferred embodiment, the metal oxide precursor is provided in an appropriate amount of solvent, preferably in an organic solvent such as an alcohol or glycol solvent. In another preferred embodiment, the organic solvent optionally contains a small amount of water, for instance, about 0.01% to about 5% by weight of the organic solvent, and preferably about 0.1% to about 2% by weight of the organic solvent. In this embodiment, the metal oxide precursor is preferably a metal halide.

In another embodiment, the metal oxide precursor is provided in the medium in which the subsequently formed metal oxide sols will be incorporated. For example, if the metal oxide sols are to be incorporated into a curable resin system, the metal oxide precursor can be provided in the monomers of the uncured resin.

The molar ratio of the amount of the metal oxide precursor combined with the multifunctional compound is from about 1:0.1 to about 1:3, preferably from about 1:0.2 to about 1:1.5, and more preferably from about 1:0.3 to about 1:1.2 (assuming the multifunctional compound contains a bidentate chelating functional group).

In one embodiment, when contacting the metal oxide precursor with a multifunctional compound, it is desirable for the multifunctional compound to coordinate with at least about 10% of the chelateable sites on the metal oxide precursor molecules (considering the number of chelateable sites on all of the metal oxide precursor molecules in a given reaction vessel). In another embodiment, it is desirable for the multifunctional compound to coordinate with at least about 25% of the chelateable sites. In yet another embodiment, it is desirable for the multifunctional compound to coordinate with at least about 50% of the chelateable sites. In still yet another embodiment, it is desirable for the multifunctional compound to coordinate with at least about 75% of the chelateable sites. The extent to which the multifunctional compound coordinates with the metal oxide precursor depends upon the relative amounts of the materials used, the number of chelateable sites on the metal oxide precursor molecules, and whether the multifunctional compound contains a bidentate, tridentate, etc., chelating functional group. NMR can be used to monitor the coordination of the metal oxide precursor.

The metal oxide precursor is contacted with a multifunctional compound at a temperature suitable to permit the multifunctional compound to coordinate with the metal oxide precursor. In one embodiment, the temperature is from about 0° C. to about 50° C., but preferably about room temperature. It is important to ensure that the chelating functional group of the multifunctional compound coordinates with the metal oxide precursor prior to partial hydrolyzation with a hydrolyzing agent such as water.

Subsequent to treatment with the chelating compound, the chelated metal oxide precursor is partially hydrolyzed by contact with a hydrolyzing agent. That is, unchelated atoms, groups or sites which are directly or indirectly connected to the metal atom of the chelated metal oxide precursor are hydrolyzed thereby providing a monomer of a partially hydrolyzed chelated metal oxide precursor. The chelated atoms or groups are generally not hydrolyzed, although a small fraction of the chelated groups may be hydrolyzed in some instances. So long as the percentage of chelated sites remains as described above, problems are not generally encountered. In one embodiment, the temperature at which the chelated metal oxide precursor is partially hydrolyzed is from about 0° C. to about 50° C., but preferably about room temperature.

Partial hydrolysis may be carried out by contacting the chelated metal oxide precursor with a hydrolyzing agent such as water, and preferably deionized water. The hydrolyzing agent converts the unchelated atoms or groups to hydroxyl groups. In one embodiment, the molar ratio of the chelated metal oxide precursor to water is about 1:0.5 to about 1:3, and preferably about 1:1 to about 1:2. In one embodiment, the chelated metal oxide precursor is contacted with a hydrolyzing agent in a solvent and preferably an organic solvent. In another embodiment, the chelated metal oxide precursor is contacted with a hydrolyzing agent in resin monomers and/or other ingredients. In this connection, the metal oxide sols can also be prepared in resin monomers without a solvent, or in the absence of a non-reactive element, such as a non-reactive diluent, as set forth in Example 15 below.

The partially hydrolyzed chelated metal oxide precursor are reactive monomers. Once formed, the monomers of the partially hydrolyzed chelated metal oxide precursor proceed to form the metal oxide sol of the invention by limited polycondensation. Since the monomers are partially chelated, the polycondensation is controlled whereby micro-clusters of several monomers are formed. That is, since polycondensation is controlled, the micro-clusters do not agglomerate and/or aggregate into gel form. Polycondensation may be controlled by varying the amount of hydrolyzing agent used and varying the percentage of chelated sites on the metal oxide precursor molecules.

On average, the oligomers constitute micro-clusters which may be made up of about 2 to about 5,000 partially hydrolyzed chelated metal oxide precursor monomers. In a preferred embodiment, the micro-clusters may be made up of about 3 to about 1,000 partially hydrolyzed chelated metal oxide precursor monomers. In a more preferred embodiment, the micro-clusters may be made up of about 4 to about 100 partially hydrolyzed chelated metal oxide precursor monomers. In an even more preferred embodiment, the micro-clusters may be made up of about 5 to about 25 partially hydrolyzed chelated metal oxide precursor monomers. The average number of monomers which constitute a given micro-cluster can be determined by considering at least one of a number of parameters including the average size of a micro-cluster, the identity of the atoms of the partially hydrolyzed chelated metal oxide precursor, the relative amounts of the micro-clusters of the partially hydrolyzed chelated metal oxide precursor and the liquid solvent (density), the length of time of the polycondensation reaction, the nature of the metal oxide precursor and the multifunctional compound, the extent (percentage) of coordination and the amount of hydrolyzing agent used.

The micro-clusters of the metal oxide sol may have an amorphous shape or a symmetrical shape. In this connection, the polycondensation reaction is a random polymerization. Thus, the micro-clusters may assume one or more of linear configuration, branched configuration, cluster configuration, dendrimer configuration, and cyclic configuration.

The resultant metal oxide sols are surprisingly stable. Once made, the metal oxide sols can be stored as a colloidal dispersion for extended periods of time. It is believed that this is because the micro-clusters tend not to agglomerate. For example, in one embodiment, the metal oxide sols can be stored (colloidal dispersion maintained) for up to about 10 weeks, and in another embodiment, up to about 25 weeks at room temperature in a sealed container.

The resulting metal oxide sols may be incorporated as an additive into a plethora of substances. More specifically, the micro-clusters of the resulting metal oxide sols may be incorporated as an additive into a variety of organic and inorganic substances. As an additive, the resulting metal oxide sols provide one or more numerous desirable properties to substances in which they are incorporated. Desirable properties include abrasion resistance, adhesion enhancement, chemical attack resistance, corona resistance (for example, due to high field intensities), high compatibility, high dispersibility, mechanical strengthening, oxide erosion resistance, plasma etch resistance, prevention of void formation, resistance to monoatomic oxygen attack, small size, undetectable to the human eye and uniform dispersibility. On one hand, some of these properties are possessed by the metal oxide sols (or the micro-clusters). For example, the metal oxide sols possess corona resistence due to high field intensities. On the other hand, some of these properties are possessed by the substances in which the inventive metal oxide sols can be incorporated.

Examples of substances in which the inventive metal oxide sols can be incorporated include plastics (thermoplastics and thermosets), other organic substances such as adhesives, fibers, ceramics, coatings, composites, paints, glasses, liquid compositions and fabrics. Examples of plastics include resins and curable resins, such as unsaturated polyester, polyamide, polyimide, polyurethane, polyetherimide, polyesteramideimide, epoxy, acrylic, polyvinyl acetal, polyamideimide, polyesterimide, polyarylsulfone, acrylamide, alkyd, fluorinated, polyolefin, polyvinyl halide, phenolic, polycarbonate polyvinylaromatic, and polyorganosilicon resins.

The following examples illustrate the preparation of substances in which the inventive metal oxide sols can be incorporated.

EXAMPLE C
UV-Curable Resin Mixture

A mixture of tris(2-hydroxyethyl)isocyanurate triacrylate (Sartomer SR368, 9.0 gm), urethane acrylate (Sartomer CN971 A80, 13.2 gm), bisphenol A ethoxylate (1 EO/phenol) diacrylate (Aldrich Chem., 60 gm), and isobornyl acrylate (Sartomer SR 506, 9.0 gm) in a brown glass bottle is stirred until a homogenous solution is obtained. Subsequently, 2-isopropylthioxanthone photoinitiator (0.36 gm) and ethyl 4-dimethylaminobenzoate co-photoinitiator (1.08 gm) are added, and the resulting solution is further stirred giving a clear solution of a Resin Mixture.

EXAMPLE D
UV-Curable Resin Composition

A mixture of tris(2-hydroxyethyl)isocyanurate triacrylate (Sartomer SR386, 0.95 gm), urethane acrylate (Sartomer CNN699J25, 1.4 gm), and benzylmethacrylate (Aldrich Chem., 3.5 gm) is stirred in a brown glass bottle until a homogenous solution is obtained. Subsequently, the resin is mixed with 2-isopropyithioxanthone photoinitiator (0.066 gm) and ethyl 4-dimethylaminobenzoate co-photoinitiator (0.19 gm). The resulting mixture is further stirred giving a clear solution.

The resulting metal oxide sol can be mixed with resin monomers, an initiator, and various other ingredients to form a clear solution. An advantage of using the resulting metal oxide sol is that it does not form any type of precipitate, even over a long period of time, for example, at least about six months. Appreciable amounts of precipitates are not formed if the metal oxide sols are simply stored by themselves or stored after being mixed with resin monomers and other ingredients. In other words, noticeable agglomeration of the micro-clusters does not generally occur. Storage is preferably effected in a dry, dark, room temperature environment.

In one embodiment, the solvent used to prepare the resulting metal oxide sol can be removed before mixing the sol with the substance with which it will be combined, such as a combination with resin monomers or other ingredients. In another embodiment, the solvent may be removed from the sol after it has been combined with the substance with which it will be combined, but prior to using the substance. In yet another embodiment, the resulting metal oxide sol solvent may be removed subsequent to using the substance by the application of heat, at temperatures high enough to volatize the solvent.

The resulting metal oxide sol, and particularly the micro-clusters, may be included as an additive to a substance up to about 70% by weight of the total composition. Preferably, at least about 0.1% by weight of the total composition is the metal oxide sol additive, and more preferably from about 0.5% to about 40% by weight of the total composition is a metal oxide sol additive. The amount of additive used in a particular substance is determined by processability and performance of the resultant substance made with the metal oxide sol by viscosity requirements, by mechanical, electrical and thermal properties, and by other concerns. The maximum amount used may be determined, however, in a practical respect by the mechanical parameters of the substance.

The micro-clusters of the metal oxide sols mix homogeneously with the substance in which they are incorporated. In embodiments where the metal oxide sols mix homogeneously with a resin, it is possible to obtain a clear composition. Such a clear composition can be transparent to a photocure source regardless of thickness, and not susceptible to metal oxide precipitation as are conventional photocurable resins containing metal oxide fillers.

In embodiments where the metal oxide sol is added to a polymer resin system, high shear mixing is not required to produce a homogeneous composition. In some embodiments where the metal oxide sol is added to a polymer resin system, a transparent composition is obtainable. The fact that the metal oxide sol is used in the sol form has an added benefit in that it is not necessary to use organic solvents.

The substances containing the micro-clusters (made with metal oxide sols) may be processed using conventional techniques associated with processing the the substance. For example, when the substance is a curable resin system containing the micro-clusters, the curable resin system containing the micro-clusters is cured in a conventional manner. When the substance is a ceramic green sheet containing the micro-clusters, the ceramic green sheet containing the micro-clusters is sintered in a conventional manner.

While not being bound by any specific mechanism or theory, it is speculated that the substances containing the micro-clusters may be substantially void free. By "void free" it is meant that the substance is pinhole-free, lacking holes or other fissures in the surface or in the volume thereof. In one embodiment, substantially void free indicates that a substance containing the micro-clusters is more than about 99% pinhole-free. In another embodiment, substantially void free indicates that a substance containing the micro-clusters is more than about 99.5% pinhole-free. In yet another embodiment, substantially void free indicates that a substance containing the micro-clusters is more than about 99.9% pinhole-free. The substances containing the micro-clusters may also be characterized by their homogenous nature after cure. The term "transparent" as used herein with relation to the cured coating refers to the homogeneity of the coating at the molecular level.

Another advantage associated with using the metal oxide sols is the capability to use substances containing the micro-clusters in a very thin applications. This is due to the lack of particulate matter in the substance, which allows the substance to be applied uniformly. Alternatively, thicker applications aria also easily achieved due to the transparent nature of the micro-clusters in the substance.

The following examples illustrate the process of the present invention. Unless otherwise indicated in the following examples and elsewhere in the specification and claims, all parts and percentages are by weight, all temperatures are in degrees Centigrade, and pressure is at or near atmospheric pressure.

EXAMPLE 1
Preparation of Metal Oxide Sol

A mixture of aluminum triisopropoxide (2.99 gm, 14.7 mmole) and 2-methoxyethanol (13 gm) is stirred at 90° C. until a clear solution is obtained. After cooling to room temperature, 2-(methacryloyloxy)ethyl acetoacetate chelating agent (1.6 gm, 7.5 mmole) is first added to the solution and the resulting solution is stirred for 30 minutes before the addition of deionized water (0.26 gm, 14.7 mmole). The resulting mixture is further stirred for one hour to obtain a clear and stable metal oxide sol based on aluminum which shows no gel formation even after storage for three months.

Without using the multifunctional compound, the aluminum alkoxide solution quickly generates gelatinous white precipitate upon exposure to moisture.

EXAMPLE 2
Preparation of Metal Oxide Sol

A mixture of aluminum triisobutoxide (1.56 gm, 6.3 mmole) and 2-propanol (3.8 gm) is stirred for ten minutes at room temperature. To the solution, 2-(methacryloyloxy) ethyl acetoacetate chelating agent (0.65 gm, 3 mmole) is added and the resulting solution is stirred for thirty minutes. The addition of deionized water (0.11 gm, 6.3 mmole), followed by stirring for one hour, gives a clear and stable metal oxide sol based on aluminum which shows no gel formation even after storage for three months.

Without using the multifunctional compound, the aluminum alkoxide solution quickly generates gelatinous white precipitate upon exposure to moisture.

EXAMPLE 3
Preparation of Metal Oxide Sol

To a solution of aluminum trisobutoxide (0.24 gm, 0.98 mmole) and 2-methoxyethanol (0.76 gm), 4-(methacryloylamino)salicylic acid (0.19 gm, 0.92 mmole) is added and the solution is stirred for thirty minutes. The addition of deionized water (17 mg, 0.94 mmole) and stirring for one hour gives a clear and stable metal oxide sol based on aluminum.

EXAMPLE 4
Preparation of Metal Oxide Sol

Hydroxyethyl salicylate (1.87 gm, 10 mmol) is added to a solution of aluminum tributoxide (4.12 gm, 17 mmol) and methoxyethanol (11.5 gm) and stirred for 30 minutes. To the solution, deionized water (0.47 gm, 26 mmol) is added and the resulting solution is stirred overnight to give a clear, stable metal oxide sol.

EXAMPLE 5
Preparation of Metal Oxide Sol

Hydroxyethyl salicylamide (1.24 gm, 6.9 mmol) is added to a solution of aluminum tributoxide (4.123 gm, 17 mmol) and methoxyethanol (16 gm) and stirred for 30 minutes. To the solution, deionized water (0.47 gm, 26 mmol) is added and the resulting solution is stirred overnight to give a clear, stable metal oxide sol.

EXAMPLE 6
Preparation of Metal Oxide Sol

Hydroxyethyl salicylate (0.753 gm, 4.1 mmol) is added to a solution of zirconium tetrapropoxide (3.353 gm, 10.2 mmol) and methoxyethanol (36 gm) and stirred for 30 minutes. To the solution, deionized water (0.37 gm, 20.4 mmol) in 2-methoxyethanol (2 gm) is added and the resulting solution is stirred overnight to obtain a clear, stable metal oxide sol.

EXAMPLE 7
Preparation of Metal Oxide Sol

To a solution of titanium tetrapropoxide (49.72 gm, 0.175 mole) and methoxyethanol, methoxyethanol (28.4 gm) in a glass vessel, 3-hydroxy-2-methyl-4-pyrone (14.5 gm, 0.115 mole) is added and the resulting solution is stirred overnight to obtain a clear, stable metal oxide sol.

EXAMPLE 8
Preparation of Metal Oxide Sol

3-Hydroxy-2-methyl-4-pyrone (5.49 gm, 0.079 mol) is added to a solution of aluminum tributoxide (21.46 gm, 0.147 mol) in a 2-methoxyethanol (45 gm) and stirred for 30 minutes. To the solution, deionized water (2.96 gm, 0.164 mol) in methoxyethanol is added and the resulting solution is stirred overnight to obtain a clear, stable metal oxide sol. The sol is stable and no gelation is observed even after storage for six months at room temperature.

EXAMPLE 9
Preparation of Metal Oxide Sol

A mixture of N(acetoacetyl)glycine (3.18 gm, 20 mmol) and butyl glycidyl ether (2.6 gm, 20 mmol) in methoxyethanol (1.5 gm) is stirred at 80° C. for 5 hrs to form a corresponding glycine ester having a hydroxy group. The above mixture (1.32 gm) is then added to a solution containing aluminum tributoxide (2.57 gm, 10.4 mmol) and methoxyethanol (10 gm) and the resulting solution is stirred for 30) minutes. To the mixture, a solution of deionized water (0.37 gm, 20.4 mmol)/methoxyethanol (0.3 gm) is added and the resulting mixture is stirred overnight to generate a metal oxide sol based on aluminum.

EXAMPLE 10
Preparation of Metal Oxide Sol

A homogeneous mixture of aluminum tributoxide (0.37 gm, 1.5 mmol) and bisphenol A ethoxylate (2EO/PhOH) (0.3 gm) is prepared in a vial. Subsequently, 3-Hydroxy-2-methyl-4-pyrone (0.066 gm, 0.53 mmol) is added and the resulting mixture is stirred for 30 minutes. After addition of deionized water (0.04 gm, 2.3 mmol), the resulting mixture is stirred overnight and then heated to 80° C. under vacuum giving a metal oxide sol as a viscous clear liquid.

EXAMPLE 11
Preparation of Metal Oxide Sol o-Hydroxybenzoylacetone (0.62 gm, 3.5 mmol) is added to a solution of zirconium tetrabutoxide (3.84 gm, 10 mmol) in methoxyethanol (5 gm) and the solution is stirred for 30 minutes. To the solution, deionized water (0.036 gm, 20 mmol) in methoxyethanol (1 gm) is added while stirring and the resulting solution is stirred overnight to give a clear sol. To the sol, bisphenol A bis diethylene glycol (4.2 gm) is added and the mixture is slowly heated to 80° C. under vacuum to remove volatile components. The resulting metal oxide sol based on zirconium is yellow; but clear viscous liquid (6.0 gm).

EXAMPLE 12
Preparation of Metal Oxide Sol

A solution containing aluminum tributoxide (2.46 gm, 10 mmol) and tetraethyl orthosilicate (2.08 gm, 10 mmol) is prepared in methoxyethanol (50 gm). To the solution, 3-Hydroxy-2-methyl-4-pyrone (0.5 gm, 4 mmol) is added and the resulting solution is stirred for 30 minutes. To the solution, water (0.63 gm, 35 mmol) in methoxyethanol (1.5 gm) is added and the solution is stirred overnight to generate a clear stable metal oxide sol based on aluminum and silicon.

EXAMPLE 13
Composition Containing Metal Oxide Sol

The metal oxide sol from Example 1 (17 gm) is charged into a flask and the volatiles are removed under vacuum to give a clear viscous residue (2.9 gm). To the residue, the Resin Mixture from Example C (5.62 gm), isobornyl acrylate (1.25 gm) and 2-methoxyethanol (2 gm) are added, and the resulting mixture is stirred to obtain a clear solution. The clear solution is applied onto a glass plate and UV-cured for one minute under $N_2$ using a BLAK-RAY UV Lamp B™ (UVP Corp., Upland, Calif.) forming a clear hard film having good adhesion to the substrate.

EXAMPLE 14
Composition Containing Metal Oxide Sol

A solution containing the aluminum trimethoxyethoxide solution from Example A (1 gm), isobornyl acrylate (3 gm), trimethylolpropane triacrylate (0.36 gm), 2-(methacryloyloxy)ethyl acetoacetate (0.34 gm), 2-isopropylthioxanthone photoinitiator (0.05 gm), and ethyl 4-dimethylaminobenzoate co-photoinitiator (0.14 gm) is stirred at room temperature for thirty minutes. After the addition of deionized water (0.03 gm), the resulting solution is further stirred for one hour. Removal of the volatiles under vacuum gives a clear solution (4.1 gm). The solution is bar-coated onto a glass plate and UV-cured for one minute under $N_2$ giving a clear, hard film with good adhesion to the substrate.

The identical solution without the 2-(methacryloyloxy) ethyl acetoacetate multifunctional compound is also prepared. In this case, however, the solution becomes opaque upon addition of water, and gradually generates a white precipitate. Attempts to form a clear uniform coating are unsuccessful due to the formation of gelatinous white precipitates during the application of the coating.

EXAMPLE 15
Composition Containing Metal Oxide Sol

To a homogenous solution containing isobornyl acrylate (3 gm), trimethylolpropane triacrylate (0.5 gm), and aluminum triisobutoxide (0.67 gm), 2-(methacryloyloxy)ethyl acetoacetate (0.54 gm) is added, and the resulting solution is stirred for thirty minutes at room temperature. After the addition of 2-isopropylthioxanthone photoinitiator (0.05 gm), ethyl 4-dimethylaminobenzoate co-photoinitiator (0.14 gm), and deionized water (0.05 gm), the resulting mixture is stirred at room temperature for one hour giving a clear solution. The clear solution is then applied to a glass plate and UV-cured for one minute under $N_2$ giving a clear and hard film, with good adhesion to the substrate.

EXAMPLE 16
Compositions Containing Metal Oxide Sol

Three compositions Examples 16-1, 16-2 and 16-3, containing a metal oxide sol based on aluminum, shown in Table I, are prepared by:

(1) mixing the Resin Mixture prepared in Example C and the aluminum trimethoxyethoxide (ATME) solution prepared in Example A;

(2) adding 2-(methoacryloyloxy)ethyl acetoacetate (MEAA);

(3) stirring for thirty minutes;

(4) adding deionized water; and (5) stirring for one hour.

The resulting solutions are clear and low in viscosity, and coatable by various techniques, including spin and spray coatings. No change in viscosity and clarity is observed, even after aging over three months at room temperature, in the dark. The compositions are cast onto glass plates and UV-cured for one minute under $N_2$ giving clear, hard films having good adhesion to the substrate.

TABLE I

COMPOSITIONS CONTAINING METAL OXIDE SOL

| EXAMPLE | AMOUNT OF RESIN FROM EXAMPLE C | ATME SOLUTION FROM EXAMPLE A | MEAA | WATER |
|---|---|---|---|---|
| 16-1 | 3.9 gm | 1.1 gm | 0.27 gm | 0.04 gm |
| 16-2 | 3.4 gm | 2.67 gm | 0.55 gm | 0.09 gm |
| 16-3 | 2.0 gm | 3.3 gm | 0.40 gm | 0.11 gm |

Corona Resistance Testing

The compositions from Examples C, 16-1 and 16-2 are bar-coated at various levels on the polyimide surface of 3"×3" polyimide (76.2 μm)/adhesive (20.3 μm)/copper (107 μm) laminates (GTS FLEXIBLE MATERIALS, INC., Warwick R.I.). The coated substrates are subsequently heated to 60–80° C. and exposed to a BLAK-RAY UV Lamp Model B™ (UVP Corp., Upland, Calif.) for one minute under $N_2$. Test samples are also prepared by coating on a 3"×3" Cu plate having a thickness of 0.83 mm as described above. The cured films exhibited good adhesion to these substrates and no delamination is observed. The cured films are tested for corona resistance by a needle point corona resistance test which follows a modified ASTM D2275-80 test method. The electrode assembly for the test consists of a needle point electrode and plane arrangement with a 1 mm air gap between the electrode and the sample. The plane electrode comprises the test substrate/sample whether coated, uncoated, etc.

The test results set forth in Table II demonstrate the enhanced performance of the subject coating over the use of a conventional coating or no coating, with respect to product life, i.e., time to coating failure due to corona attack.

TABLE II

RESULTS OF NEEDLE POINT CORONA RESISTANCE TESTING

| Composition Example | Sample Description (ATME + MEAA)/ Resin | Substrate | Coating Thickness (microns) | Applied Voltage (kV) | Time to Failure (hours) |
|---|---|---|---|---|---|
| no coating | | polyimide/ copper | 0 | 5.2 | 11.6 |
| no coating | | polyimide/ copper | 0 | 5.2 | 14.2 |

TABLE II-continued

RESULTS OF NEEDLE POINT CORONA RESISTANCE TESTING

| Composition Example | Sample Description (ATME + MEAA)/ Resin | Substrate | Coating Thickness (microns) | Applied Voltage (kV) | Time to Failure (hours) |
|---|---|---|---|---|---|
| C | 0 | polyimide/copper | 15 | 5.2 | 30.8 |
| C | 0 | polyimide/copper | 18 | 5.2 | 41.2 |
| 16-1 | 0.2 | polyimide/copper | 10 | 5.2 | 74.9 |
| 16-1 | 0.2 | polyimidel/copper | 9 | 5.2 | 99.8 |
| 16-2 | 0.52 | polyimidel/copper | 12 | 5.2 | 134.4 |
| 16-2 | 0.52 | polyimidel/copper | 12 | 5.2 | 117.2 |
| 16-2 | 0.52 | polyimidel/copper | 12 | 5.2 | 96.8 |
| C | 0 | copper | 99 | 5.2 | 25 |
| C | 0 | copper | 99 | 5.2 | 16.6 |
| 16-1 | 0.2 | copper | 99 | 5.2 | 315.4 |

COMPARATIVE EXAMPLE 1
Composition Without Multifunctional Compound

A composition identical to that of Example 16-2, but without the multifunctional compound is also prepared. In this case, however; the solution becomes opaque upon addition of water and gradual precipitation of aluminum oxide gel is observed. The same composition containing neither multifunctional compound nor water is also prepared. The solution, when applied onto a glass plate, quickly generates a white precipitate, resulting in the formation of a non-uniform opaque film.

COMPARATIVE EXAMPLE 2
Composition with 2.4-pentanedione

A composition comprising the Resin Mixture from Example C (1.0 gm), aluminum trimethoxyethoxide solution from Example A (1.6 gm), 2,4-pentane dione (0.28 gm), and water (0.05 gm) is prepared as described in Examples 4–6. The resulting solution is clear and low in viscosity. The solution, although clear before UV exposure, becomes highly opaque during UV cure, indicating phase separation of the inorganic component due to the chelating agent not having any reactable functional groups.

COMPARATIVE EXAMPLE 3
Resin Composition Containing Fumed Aluminum Oxide

To the Resin Mixture from Example C (1.76 gm), fumed aluminum oxide (Degussa aluminum oxide-C, 0.24 gm) is added in a glass bottle. Since the viscosity is too high to homogenize with a magnetic stirrer, 3-methacryloxypropyltrimethoxysilane coupling agent (0.04 gm) is added to the mixture. The viscosity of the resulting blend gradually lowers and the fumed $Al_2O_3$ completely disperses into the resin. The resin viscosity is further lowered by adding 2-methoxyethanol (0.5 gm). The resulting composition is highly opaque and is not suitable for UV cure application. Furthermore, the solution, when aged, tends to precipitate the filler.

EXAMPLE 17
Composition Containing Metal Oxide Sol

A composition containing the Resin from Example D (3.06 gm), the metal oxide precursor from Example A (1.75 gm), MEAA (0.43 gm), and deionized water (0.06 gm) is prepared as described in Examples 16-1 to 16-3. The resulting solution is clear and low in viscosity, and suitable for coating applications.

Corona Endurance Testing

The compositions from Examples D and 17 are bar-coated onto the polyimide surface of 3"×3" polyimide (76.2 μm)/adhesive (20.3 μm)/copper (107 μm) laminates (GTS FLEXIBLE MATERIALS INC, Warwick R.I.), and UV-cured giving clear hard films. The cured films exhibit good adhesion to the substrate and no delamination is observed. Corona endurance testing of the samples set forth in Table III demonstrates the enhanced performance of the subject coating over the use of a conventional coating or no coating with respect to product life, i.e., time to coating failure due to corona attack.

TABLE III

RESULTS OF NEEDLE POINT CORONA RESISTANCE TESTING

| Composition Example | Sample Description (ATME + MEAA)/ Resin | Substrate | Coating Thickness (microns) | Applied Voltage (kV) | Time to Failure (hours) |
|---|---|---|---|---|---|
| no coating | | polyimide/copper | 0 | 5.2 | 12.9 |
| D | 0 | polyimidel/copper | 18 | 5.2 | 41.2 |
| 17 | 0.4 | polyimidel/copper | 9 | 5.2 | 99.8 |

EXAMPLE 18
Composition Containing Metal Oxide Sol

The metal oxide sol of Example 9 is admixed with a 1:1 mixture of bisphenol F epoxy/bisphenol A epoxy (7.7 gm). Volatile components are then removed under vacuum. Subsequently, Anchor 1222 catalyst (from Air Products and Chemicals) (0.1 gm) and 8-hydroxyquinoline (0.3 gm) are added to form a clear resin composition. The resin composition is stable and no gelation is observed even after storage for six months at room temperature. The composition is coated on a glass plate and cured in an oven at 180° C. for 3 hrs to give a clear yellow film exhibiting good adhesion to the substrate.

EXAMPLE 19
Composition Containing Metal Oxide Sol

The metal oxide sol of Example 10 is admixed with bisphenol F epoxy (PY306, Ciba Ceigy, 0.43 gm), phenol novolac epoxy (PY307, Ciba Ceigy, 0.57 gm), and cresyl glycidyl ether (Ciba Ceigy, DY023, 0.11 gm), and (3-glycidoxypropyl)trimethoxysilane (0.02 gm). After forming a homogeneous solution, Anchor 1222 catalyst (0.05 gm) is added to generate a low viscosity clear epoxy resin composition containing a metal oxide sol. The resin composition is stable and no gelation is observed even after six months at room temperature. The composition is coated on a glass plate and heated to 180° C. for 3 hrs to give a clear film exhibiting good adhesion to the substrate.

EXAMPLE 20
Composition Containing Metal Oxide Sol

The metal oxide sol of Example 11 is admixed with bisphenol F epoxy (PY306, Ciba Geigy, 4.3 gm), phenol novolac epoxy (PY307, Ciba Geigy, 5.7 gm), and cresyl glycidyl ether (Ciba Ceigy, DY023, 1.1 gm), and (3-glycidoxypropyl)trimethoxysilane (0.06 gm). After forming a homogeneous solution, Anchor 1222 catalyst (0.5 gm) is added to generate a low viscosity epoxy resin composition containing a metal oxide sol based on zirconium. The resin composition is coated on a glass plate and heated to 180° C. for 3 hrs to give a clear film.

Preparation of Epoxy Resin Systems

Seven epoxy resin compositions are prepared as shown in Table IV. Four resin compositions (Examples 21–24) contain the metal oxide sol of Examples 4–7, respectively. Comparative Example 4 is prepared as a control and does not contain a metal oxide additive. Comparative Examples 5 and 6 contain colloidal silica and fumed aluminum oxide, respectively. All of the compositions are prepared by mixing the epoxy, the diol, the silane, and the metal oxide additives to form homogeneous solutions and then volatile components are removed under vacuum. Finally, Anchor 1222 catalyst is added to generate low viscosity, solventless resin compositions. The resin compositions of Examples 21–24 are stable and no gelation is observed even after three months at room temperature. In the case of Comparative Example 6, a high shear mixer is used to disperse the filler before addition of the catalyst.

TABLE IV

EPOXY RESIN FORMULATIONS WT %

| EXAMPLE | C4 | 21 | 22 | 23 | 24 | C5 | C6 |
|---|---|---|---|---|---|---|---|
| Aralddite CY179 epoxy (1) | 4.4 | 4.4 | 4.4 | 4.4 | 4.4 | 4.4 | 4.4 |
| Bisphenol A diol(2) | 2 | 2 | 2 | 2 | 2 | 2 | 2 |
| Sol in Example 4 | | 9 | | | | | |
| Sol in Example 5 | | | 7.1 | | | | |
| Sol in Example 6 | | | | 14.8 | | | |
| Sol in Example 7 | | | | | 4.18 | | |
| IPA-ST (3) | | | | | | 1.2 | |
| Aluminum oxide C (4) | | | | | | | 0.27 |
| Silane (5) | 0.04 | 0.04 | 0.04 | 0.04 | 0.04 | 0.04 | 0.04 |
| Anchor 1222(6) | 0.26 | 0.26 | 0.26 | 0.26 | 0.26 | 0.26 | 0.26 |

(1): 3',4'-Epoxycyclohexylmethyl3,4-epoxycylohexanecarboxylate form Ciba Geigy
(2): Bisphenol A ethoxylate (2EO/PhOH) from Aldrich Chemical
(3): Colloidal silica (31%) in isporopanol from Nissan Chemical
(4): Fumed aluminum oxide from Degussa
(5): 2-(3,4-Epoxycyclohexyl)ethyltrimethoxysilane
(6): Catalyst from Air Products and Chemicals Corona Endurance Testing The epoxy resin compositions prepared in Examples 21–24 and Comparative Examples 4–6 are bar-coated on a polyimide surface of 3"×3" polyimide (76.2 mm)/adhesive (20.3 mm)/copper (107 mm) laminates (GTS FLEXIBLE MATERIALS INC., WARWICK, R.I.) and Copper plates (Cu thickness of 1.045 mm), respectively. The coatings are then cured in an oven at 80° C./1 hr and 180° C./3 hrs to give pinhole free coatings. All the cured films except Comparative Example 6 provide clear films. The cured films of Examples 21–24 exhibit good adhesion to the substrates and no delamination is observed. Corona testing is performed at room temperature using the needle point corona test. The air gap between the needle point electrode tip and the specimen is 1.0 mm and the applied voltage is 5.2 KV AC RAS. Corona endurance testing of the samples set forth in Table V demonstrated that the substantially enhanced performance of the compositions containing the inventive metal oxide sols over the use of conventional coatings (containing no metal oxide additive, commercial fumed silica or alumina) with respect to product life, i.e. time to coating failure due to corona attack. Transmission electron micrographs of cured films of the resin compositions containing the inventive metal oxide sols demonstrate a uniform dispersion of material that is substantially smaller than those of conventional fillers (such as fumed alumina and fumed silica). In some cases, TEMs show no formation of particles, indicating the molecular level dispersion of the inventive metal oxide sols in the polymer matrix.

TABLE V

RESULTS OF NEEDLE POINT CORONA TESTING

| EXAMPLE | ADDITIVE METAL WT % | SUBSTRATE | COATING THICKNESS MICRON | TIME TO FAILURE HOUR |
|---|---|---|---|---|
| C4 | none | Pl/Cu | 18 | 42 |
| 21 | Al, 3.0 | Pl/Cu | 13 | 414 |
| 22 | Al, 2.0 | Pl/Cu | 13 | 969 |
| 23 | Zr, 4.2 | Pl/Cu | 13 | 120 |
| 24 | Ti, 3.1 | Pl/Cu | 15 | 250 |
| C5 | Si, 2.4 | Pl/Cu | 23 | 96 |
| C6 | Al, 2.0 | Pl/Cu | 21 | 78 |
| C4 | none | Cu | 120 | 40 |
| 21 | Al, 3.0 | Cu | 120 | 223 |
| 22 | Al, 2.0 | Cu | 120 | 827 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A metal oxide sol comprising a liquid and a polycondensation product of about 2 to about 5,000 monomers of a partially hydrolyzed chelated metal oxide precursor, the partially hydrolyzed chelated metal oxide precursor comprising a partially hydrolyzed reaction product of a metal oxide precursor and a multifunctional compound, the multifunctional compound containing at least one reactable functional group that does not substantially bond with the metal oxide precursor and is selected from the group consisting of curable functional groups, photoreactive functional groups, thermocurable groups, and condensable groups and at least one chelating functional group that coordinates with the metal oxide precursor.

2. The metal oxide sol according to claim 1 comprising a polycondensation product of about 3 to about 1,000 monomers of a partially hydrolyzed chelated metal oxide precursor.

3. The metal oxide sol according to claim 1, wherein the metal of the partially hydrolyzed chelated metal oxide precursor comprises at least one of an alkaline earth metal, a transition metal or a Group 3A metal.

4. The metal oxide sol according to claim 1, wherein the metal of the partially hydrolyzed chelated metal oxide precursor comprises at least one of aluminum, calcium, magnesium, tin, titanium, zinc and zirconium.

5. The metal oxide sol according to claim 1, wherein the partially hydrolyzed chelated metal oxide precursor comprises a multifunctional compound containing at least one chelating group coordinated to at least one of an alkaline earth metal, a transition metal or a Group 3A metal.

6. The metal oxide sol according to claim 1 comprising a polycondensation product having an average diameter less than about 10 nm.

7. The metal oxide sol according to claim 1, wherein the multifunctional compound comprises at least one of acrylic acid/maleic acid copolymer, alkoxylated diamines, alkyl-diaminepolyacetic acids, aminoalkylphosphonic acid, amino-tris(methylene phosphonic acid), anthranilic acid, benzotriazole, citric acid, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, methylvinyl ether/maleic acid copolymer, o-hydroxybenzoylacetone, 5-hydroxy-2-(hydroxymethyl)4H-pyran-4-one, N-hydroxyethylenediamine triacetic acid, hydroxy-ethylidene diphosphonic acid, hydroxyethane diphosphonic acid, nitrilotriacetic acid, sorbitol and tolyltrizole.

8. The metal oxide sol according to claim 1, wherein the multifunctional compound comprises at least one of alkoxylated diamines, alkyl-diaminepolyacetic acids, aminoalkylphosphonic acid, amino tris(methylene phosphonic acid), anthranilic acid, benzotriazole, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, o-hydroxybenzoylacetone, 5-hydroxy-2-(hydroxymethyl)-4H-pyran-4-one, N-hydroxyethylenediamine triacetic acid, hydroxy-ethylidene diphosphonic acid, hydroxyethane diphosphonic acid, nitrilotriacetic acid, sorbitol and tolyltrizole.

9. A process for making a metal oxide sol comprising:
contacting a metal oxide precursor with a multifunctional compound in a liquid to provide a chelated metal oxide precursor, the multifunctional compound containing at least one reactable functional group that does not substantially bond with the metal oxide precursor and at least one chelating functional group that coordinates with the metal oxide precursor;
contacting the chelated metal oxide precursor with a hydrolyzing agent to provide partially hydrolyzed chelated metal oxide precursor monomers; and
permitting the partially hydrolyzed chelated metal oxide precursor monomers to polycondense thereby forming a metal oxide sol.

10. The process according to claim 9, wherein the metal oxide sol comprises the liquid and a polycondensation product of a partially hydrolyzed chelated metal oxide precursor.

11. The process according to claim 9, wherein the metal oxide sol has an average diameter less than about 10 nm.

12. The process according to claim 9, wherein the metal oxide precursor comprises at least one of a metal alkoxide, a metal carboxylate, a metal halide and a metal nitrate.

13. The process according to claim 9, wherein the metal oxide precursor comprises at least one of an aluminum alkoxide, an aluminum halide, a titanium alkoxide, a titanium halide, a zirconium alkoxide and a zirconium halide.

14. The process according to claim 9, wherein the multifunctional compound comprises at least one reactable functional group and at least one chelating functional group, the chelating functional group comprising at least one atom of nitrogen, oxygen, sulfur, phosphorus, arsenic and selenium.

15. The process according to claim 9, wherein the chelating functional group of the multifunctional compound comprises at least one of polyphosphates, β-diketones, acetoacetonates, aminocarboxylic acids, hydroxycarboxylic acids, polyamines, aminoalcohols, aromatic heterocyclic bases, phenols, aminophenols, oximes, phosphonic acids, Schiff bases, tetrapyrroles, thiols, xanthates, salicylic acid and hydroxyquinoline.

16. The process according to claim 9, wherein the molar ratio of the amount of the metal oxide precursor contacted with the multifunctional compound is from about 1:0.1 to about 1:3.

17. The process according to claim 9, wherein the hydrolyzing agent comprises water.

18. The process according to claim 9, wherein the metal oxide precursor is contacted with the multifunctional compound in an organic solvent.

19. The process of making a metal oxide sol according to claim 9, wherein the multifunctional compound comprises at least one of acrylic acid/maleic acid copolymer, alkoxylated diamines, alkyl-diaminepolyacetic acids, aminoalkylphosphonic acid, amino tris(methylene phosphonic acid), anthranilic acid, benzotriazole, citric acid, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, methylvinyl ether/maleic acid copolymer, o-hydroxybenzoylacetone, 5-hydroxy-2-(hydroxymethyl)-4H-pyran-4-one, N-hydroxyethylenediamine triacetic acid, hydroxy-ethylidene diphosphonic acid, hydroxyethane diphosphonic acid, nitrilotriacetic acid, sorbitol and tolyltrizole.

20. The process of making a metal oxide sol according to claim 9, wherein the multifunctional compound comprises at least one of alkoxylated diamines, alkyl-diaminepolyacetic acids, aminoalkylphosphonic acid, amino tris(methylene phosphonic acid), anthranilic acid, benzotriazole, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic, acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, o-hydroxybenzoylacetone, 5-hydroxy-2-(hydroxymethyl)-4H-pyran-4-one, N-hydroxyethylenediamine triacetic acid, hydroxy-ethylidene diphosphonic acid, hydroxyethane diphosphonic acid, nitrilotriacetic acid, sorbitol and tolyltrizole.

21. A metal oxide sol made by a process comprising:

contacting a metal oxide precursor with a multifunctional compound to provide a chelated metal oxide precursor, the multifunctional compound containing at least one reactable functional group selected from the group consisting of polyphosphates, ∃-diketones, acetoacetonates, aminocarboxylic acids, hydroxycarboxylic acids, hydroxyquinolines, polyamines, aminoalcohols, aromatic heterocylic bases, phenols, aminophenols, oximes, phosphonic acids, Schiff bases, tetrapyrroles, xanthates, and salicylic acid and at least one chelating functional group selected from the group consisting of vinyl, acrylamide, styryl, acrylic, hydroxy, amine, carboxylic, and thio groups;

hydrolyzing the chelated metal oxide precursor to provide partially hydrolyzed chelated metal oxide precursor monomers; and permitting the partially hydrolyzed chelated metal oxide precursor monomers to polycondense thereby forming a metal oxide sol.

22. The metal oxide sol according to claim 21 comprising a polycondensation product of a partially hydrolyzed chelated metal oxide precursor, the polycondensation product comprising about 4 to about 25 monomers of the partially hydrolyzed chelated metal oxide precursor.

23. The metal oxide sol according to claim 21, wherein the metal oxide precursor comprises at least one of aluminum triethoxide, aluminum isopropoxide, aluminum sec-butoxide, aluminum tri-t-butoxide, aluminum lactate, aluminum chloride, aluminum, bromide, titanium methoxide, titanium ethoxide, titanium isopropoxide, titanium propoxide, titanium butoxide, titanium ethylhexoxide, titanium,(triethanolaminato)isopropoxide, titanium bis (ammonium lacto)dihydroxide, titanium bis(ethyl acetoacetato)diisopropoxide, titanium bis(2,4-pentanedionate)diisopropoxide, titanium chloride, titanium bromide, zirconium ethoxide, zirconium isopropoxide, zirconium propoxide, zirconium sec-butoxide, zirconium t-butoxide, zirconium acetate, zirconium citrate, zirconium chloride and zirconium bromide.

24. The metal oxide sol according to claim 21, wherein the multifunctional compound comprises at least one of acrylic acid/maleic acid copolymer, alkoxylated diamines, alkyl-diaminepolyacetic acids, aminoalkylphonic acid, amino tris(methylene phosphonic acid), anthranilic acid, benzotriazole, citric acid, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, methylvinyl ether/maleic acid copolymer, o-hydroxybenzoylacetone, 5-hydroxy-2-(hydroxymethyl)-4H-pyran-4-one, N-hydroxyethylenediamine triacetic acid, hydroxyethylidene diphosphonic acid, hydroxyethane diphosphonic acid, nitrilotriacetic acid, sorbitol and tolyltrizole.

25. The metal oxide sol according to claim 21, wherein the multifunctional compound comprises at least one of alkoxylated diamines, alkyl-diaminepolyacetic acids, aminoalkylphosphonic acid, amino tris(methylene phosphonic acid), anthranilic acid, benzotriazole, diethylenetriamine pentaacetic acid, diethylenetriamine penta(methylene phosphonic acid), ethylenediaminetetraacetic acid, gluconic acid, glucoheptonoic acid, hexamethylenediamine tetra (methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, o-hydroxybenzoylacetone, 5-hydroxy-2-(hydroxymethyl)-4H-pyran-4-one, N-hydroxyethylenediamine triacetic acid, hydroxy-ethylidene diphosphonic acid, hydroxyethane diphosphonic acid, nitrilotriacetic acid, sorbitol and tolyltrizole.

* * * * *